A. P. COCHRANE.
CORNER FASTENING.
APPLICATION FILED AUG. 6, 1917.
1,283,079.
Patented Oct. 29, 1918.
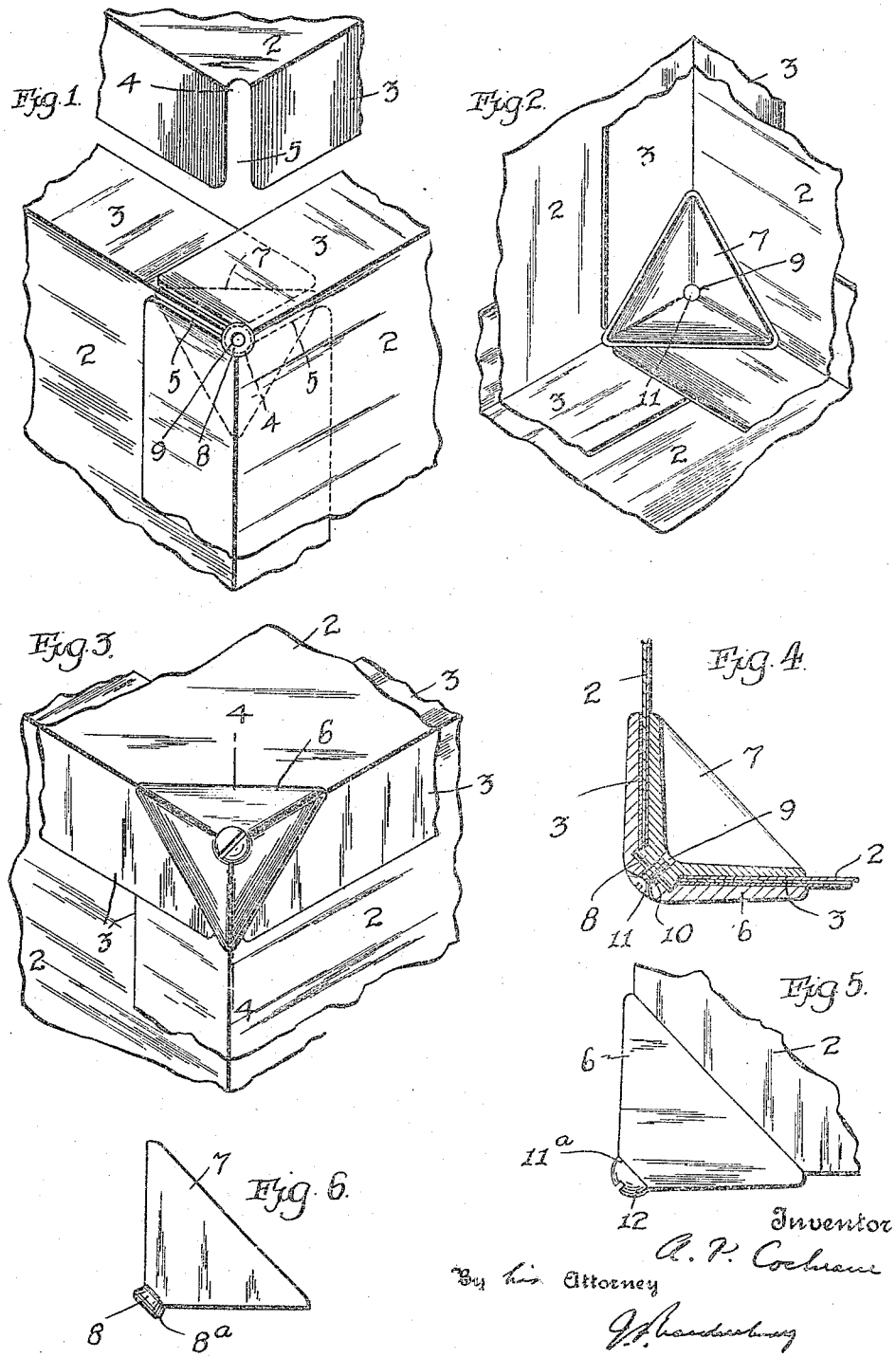

UNITED STATES PATENT OFFICE.

ALBERT PAUL COCHRANE, OF BROOKLYN, NEW YORK, ASSIGNOR TO HERVEY, BARBER & McKEE, OF NEW YORK, N. Y., A FIRM COMPOSED OF EVERETT P. HERVEY, ARTHUR WILLIAM BARBER, AND LANIER McKEE.

CORNER-FASTENING.

1,283,079.      Specification of Letters Patent.      Patented Oct. 29, 1918.

Application filed August 6, 1917. Serial No. 184,579.

*To all whom it may concern:*

Be it known that I, ALBERT PAUL COCHRANE, a citizen of the United States, and a resident of the borough of Brooklyn, in the county of Kings and city and State of New York, have invented a new and useful Corner-Fastening, of which the following is a specification.

This invention is an improvement in corner fastenings for knockdown containers made up of separate sections, more especially of the type disclosed in my Reissue Patent No. 14,294, reissued May 1, 1917. The present object is to provide a fastening which may be operated from the exterior, which is not likely to work loose, in which the screw connection is protected, and in which the amount of projection of the corner piece beyond the lines of the box may be made as small as desired.

In the accompanying drawings:

Figure 1 is a fragmentary exterior perspective view of an upper corner, partly assembled;

Fig. 2 is a fragmentary interior perspective view of a lower corner, assembled;

Fig. 3 is a perspective view of the corner of Fig. 1, completely assembled;

Fig. 4 is a section on the line 4—4 of Fig. 3;

Fig. 5 is a view of a slight modification, indicating a manner of assembling; and Fig. 6 is a view, in side elevation, of another modification.

The invention is particularly intended for embodiment in containers made of separate wall or side sections 2, part or all of which are formed with inturned marginal flanges 3. At the extreme corners of the sections are openings 4, having lateral entrances 5.

At each apical corner there is a fastening, comprising virtually pyramidal, hollow outer and inner members 6 and 7. The inner member is formed with a short, outward projecting apical neck 8, which is undercut or grooved at the sides to engage and hold in the registering corner openings. This member is also provided with a screw hole 9, extending into the neck from the outside. The outer member has a plain apical hole 10, and through this hole there is passed, from the outside, a shank of a clamping screw 11, which engages with the threaded opening of the inner member, thus clamping the members together upon the interposed layers of material.

The head of the screw is preferably countersunk in an external recess in the outer member, so that it is not subjected to shocks and strains. In this way breakage, bending or jamming of the screw elements, preventing separation or reuse of the fastening, is avoided, the screw is not likely to come loose, because it is not subjected directly to disturbance, and the fastening as a whole is rendered relatively small and compact. If desired, however, a screw 11$^a$ may be provided with an enlarged or ball head 12, to serve as a buffer and skidding member. For certain purposes this construction may be preferable, but in the majority of instances the countersunk head construction is more advantageous for the reasons given.

The positioning of the inner member of the fastening may be effected by slipping its neck through the slotted entrances of the corner openings, or, which amounts to the same thing, by passing these slotted entrances over the neck. Or, if the end of the neck be rounded, as indicated at 8$^a$ in Fig. 6, its largest transverse dimension being only slightly larger than the width of the openings, and if the material of the wall sections is not too stiff, the inner member may be snapped in place by merely forcing its neck outward through the registering corner openings of the sections.

What I claim as new is:

1. An apical corner piece for knockdown structures, comprising virtually pyramidal inner and outer members, the inner member having a short neck formed to pass through and hold in a corner opening of the structure and a screw hole extending into the neck, the outer member having an apical hole, and a connection screw which passes through the outer member and screws into the inner member.

2. An apical corner piece for knockdown structures, comprising virtually pyramidal inner and outer members, the inner member having a short neck formed to pass through and hold in a corner opening of the structure and a screw hole extending into the neck, the outer member having an apical hole, and a connection screw which passes through the outer member and screws into the inner member, the head of the screw being countersunk in the outer member.

3. An apical corner piece for knockdown structures, comprising virtually pyramidal inner and outer members, the inner member having a short neck formed to pass through and hold in a corner opening of the structure, and an externally operated screw passing inward of the members.

4. In a knockdown structure, the combination with separate interfitting flanged sections having corner openings, of virtually pyramidal inner and outer corner piece members, the inner member having a short neck formed to pass through and hold in said corner openings, and an externally operated screw passing inward of the members.

5. In a knockdown structure, the combination with separate interfitting flanged sections having corner openings, of virtually pyramidal inner and outer corner piece members both having apical holes, a screw adapted to pass from the exterior inwardly of the members, and means for holding the inner member in place prior to its engagement by the screw.

ALBERT PAUL COCHRANE.

Copies of this patent may be obtained for five cents each, by addressing the "Commissioner of Patents, Washington, D. C."